United States Patent [19]

Bessenbach et al.

[11] Patent Number: 5,064,055
[45] Date of Patent: Nov. 12, 1991

[54] COOKWARE

[75] Inventors: Hans Bessenbach, Bad Kreuznach; Michael Crummenauer, Idar-Oberstein, both of Fed. Rep. of Germany

[73] Assignee: Fissler GmbH, Idar-Oberstein, Fed. Rep. of Germany

[21] Appl. No.: 446,454

[22] Filed: Dec. 5, 1989

Related U.S. Application Data

[63] Continuation of Ser. No. 158,738, Feb. 23, 1988, abandoned.

[30] Foreign Application Priority Data

Aug. 24, 1987 [DE] Fed. Rep. of Germany ....... 3722156
Jan. 13, 1988 [DE] Fed. Rep. of Germany ....... 3800745

[51] Int. Cl.$^5$ ............................................. A47J 36/02
[52] U.S. Cl. ..................................... 220/626; 220/453; 220/912; 126/3.90
[58] Field of Search .................... 220/66, 68, 453, 626, 220/912; 126/390

[56] References Cited

U.S. PATENT DOCUMENTS

| | | | |
|---|---|---|---|
| 4,029,253 | 6/1977 | Cartossi | 220/626 X |
| 4,204,607 | 5/1980 | Zani | 220/626 |
| 4,350,259 | 9/1982 | Cartossi | 220/611 |
| 4,544,818 | 10/1985 | Minamide | 126/390 X |
| 4,552,284 | 11/1985 | Rummelsburg | 220/453 |
| 4,564,001 | 1/1986 | Maeda | 220/453 X |
| 4,596,236 | 6/1986 | Eide | 126/390 |
| 4,615,852 | 9/1986 | Matsushita et al. | 126/390 X |
| 4,646,935 | 3/1987 | Ulam | 220/453 |

FOREIGN PATENT DOCUMENTS

| | | |
|---|---|---|
| 0111867 | 12/1983 | European Pat. Off. . |
| 0221848 | 5/1987 | European Pat. Off. . |
| 1948150 | 4/1970 | Fed. Rep. of Germany . |
| 1565416 | 5/1969 | France . |
| 2119440 | 8/1972 | France . |
| 2453627 | 7/1980 | France . |
| 2449428 | 9/1980 | France . |
| 877347 | 9/1961 | United Kingdom . |

Primary Examiner—Stephen P. Garbe
Assistant Examiner—Nova Stucker
Attorney, Agent, or Firm—Breneman & Georges

[57] ABSTRACT

A cooking utensil for use on both gas, electric and induction stoves is provided composed of a container liner of stainless steel with a comparatively low wall thickness, a comparatively thick bottom plate of aluminum or a metal of similarly good heat-conducting properties and a bottom disc that is at least partially composed of magnetizable material disposed on the outside of the bottom plate. The bottom plate disposed on the outside bottom of the container and possibly the bottom disc disposed on the outside of the bottom plate can be attached by a commonly known hammer-press technique at an increased temperature preferably with an intermediate foil of aluminum or a material of similarly good heat-conducting properties. Particularly favorable results for cookware in terms of expansion reaction and corrosion have been achieved utilizing a bottom disc of a nickel alloy having the following composition: Ni: 50–100%; Cr: up to 6%; Mo: up to 6%; Cu: up to 14%; Mn: up to 6%; Si: up to 1.5%; C: up to 0.7% and the rest Fe.

21 Claims, 1 Drawing Sheet

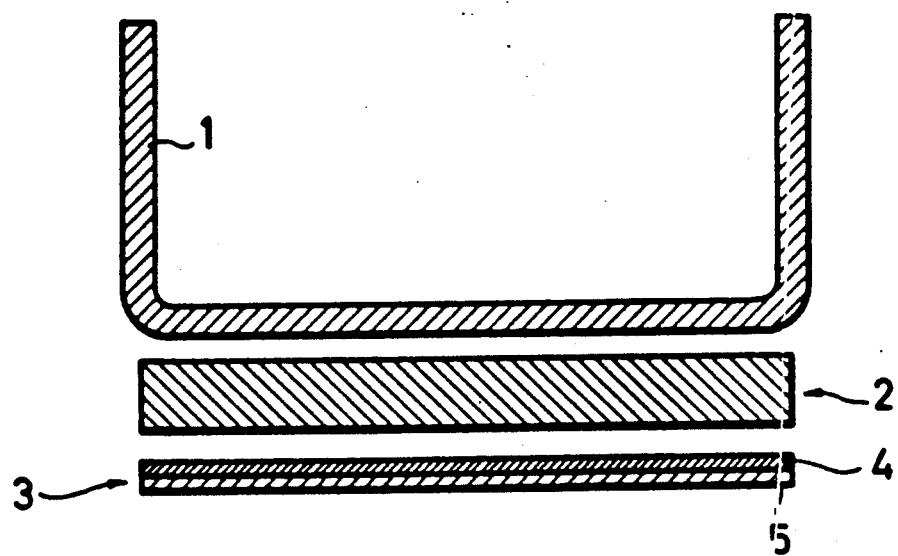

COOKWARE

CROSS REFERENCE TO RELATED APPLICATIONS

This application is a continuation of U.S. application Ser. No. 07/158,738 filed Feb. 23, 1988 which is now abandoned.

BACKGROUND OF THE INVENTION

1. Field of the Invention

The invention pertains to a cooking utensil, for example a pot or a frypan with a container liner of stainless steel with a comparatively low wall thickness and a comparatively thick bottom plate of aluminum or a material of similarly good heat-conducting properties on the outside bottom of the container liner which plate is attached to a bottom disc on the outside of the bottom plate that is at least partially composed of magnetizable material.

2. Description of Related Art

As opposed to for example enamel-on-steel cooking pots, stainless steel utensils for gas or electric ranges are appreciated for durability, good cleaning properties and attractive appearance. However, since stainless steel has a comparatively low heat-conductivity the container of the cooking utensil with its comparatively thin wall thickness is commonly provided with a comparatively thick bottom plate of aluminum or a material of similarly good heat-conducting properties. As a result of its good heat-conductivity, even if only locally heated, the bottom plate ensures an even simmering process across the entire inner bottom surface. A cooking utensil according to DE-OS 22 58 795 has a bottom plate of aluminum or a material of similarly good heat-conducting properties which employs a protective layer of stainless steel on the outside of the bottom plate with features identical to those of the container liner.

Cooking utensils of the kind commonly described consist of austenitic steel, and therefore they are not suited for the use on so-called induction stoves, because steels of austenitic structure are not or are only minimally magnetizable for the heating of the cooking utensil including its food items with the help of magnetic alternating fields.

In order not to be limited to gas or electric range use, and to include applications for induction stoves as well, a cooking utensil of stainless steel has been disclosed in an earlier not pre-published patent application U.S. Pat. No. 36 34 841.4 which consists of a bottom plate comprised of an intermediate layer of ferritic steel which is encapsulated by outer layers of austenitic steel. This solution is relatively complicated and costly due to a bottom disc of three layers.

In an earlier not pre-published patent application U.S. Pat. No. 36 39 013.5 another type of cooking utensil of the kind described heretofore is disclosed that is suited for use on gas and electric ranges as well as for induction stoves. Therein a bottom disc of aluminum or a material of similarly good heat-conducting properties is connected on its outside surface to a bottom disc of austenitic steel with magnetizable material of low thickness applied to the outside surface of the latter.

It is an object of the present invention to introduce a cooking utensil of the kind heretofore described, which is of simpler construction and provides a more effective application to an induction stove while reliably retaining a good and even transmission of heat and an even contact surface when heated on an electric range.

According to the invention this object is accomplished with a bottom disc which essentially consists of nickel or a nickel alloy or at least an intermediate layer of a nickel alloy. Surprisingly it has turned out that at such construction of a bottom layer due to the bimetal effect and/or the mix-expansion when heated results in a compensation such that the contact surface of the bottom remains reliably flat. Nickel or nickel alloys furthermore are of a very high magnetic permeability so that a relatively low layer thickness is possible to provide a more effective use on induction type stoves. Nickel furthermore can easily be formed and is particularly well plated, which results in an inexpensive production.

Furthermore, bottom discs according to the invention exhibit good resistance to corrosion.

SUMMARY OF THE INVENTION

The invention pertains to a cooking utensil, for instance a pot or a frypan, with a container liner of stainless steel, with comparatively low wall thickness and a comparatively thick bottom plate of aluminum or a material of similarly good heat-conducting properties on the outside bottom surface of the container liner as well as with a bottom disc on the outside surface of the bottom plate that is at least partially composed of magnetizable material and characterized such that the bottom disc essentially consists of nickel or a nickel alloy or at least contains an intermediate layer of nickel or nickel alloy.

DESCRIPTION OF THE PREFERRED EMBODIMENT

The concept of the invention in the preferred embodiment is such that the bottom plate can be composed of an intermediate layer of nickel and an outer layer of stainless steel, which serves as a protective layer.

Particularly favorable results are achieved in the expansion reaction under consideration with regard to the remaining material on the bottom of the container in combination with the reaction under magnetization under magnetic fields provided by common induction stoves and resistance against corrosion have been surprisingly achieved when the nickel alloy shows the following composition: Ni: 50–100%; Cr: up to 6%; Mo: up to 6%; Cu: up to 14%; Mn: up to 6%; Si: up to 1.5%; C: up to 0.7% and rest Fe.

In reference to the cited criteria, in particular with nickel alloys, the following composition has proven particularly favorable: Ni: 70–80%, preferably approx. 75%; Cr: 1 to 3%, preferably approx. 2%; Cu: 3 to 7%, preferably approx. 5%; Mn: 0.3 to 0.7, preferably approx. 0.5%, Si: 0.1 to 0.3%, preferably approx. 0.2%; C: 0.001 to 0.01%, preferably approx. 0.02% and rest Fe, or the following composition: Ni: 75 to 85%, preferably approx. 80%; Mo: 4 to 6%, preferably approx. 5%; Mn: 0.3 to 0.7%, preferably approx. 0.5%; Si: 0.2 to 0.4%, preferably approx. 0.3%; C: 0.001 to 0.01%, preferably approx. 0.02% and rest Fe.

The bottom disc mainly comprised of nickel or a nickel alloy or the intermediate layer of nickel or a nickel alloy preferably has a thickness of approx. 0.2 to 2 mm.

It has further been found to be advantageous if the bottom disc has a thickness which approximately corresponds to the wall thickness of the container.

The bottom plate for example on the outside bottom of the container and possibly the bottom disc on the outside of the bottom plate can be attached with the help of a commonly known hammer-press technique at an increased temperature preferably with an intermediate foil of aluminum or a material of similarly good heat-conducting properties.

The comparatively thick bottom plate of aluminum or a material of similarly good heat conducting properties promotes evenness of the heat flow into the inside of the cooking utensil when heating as is commonly provided by gas or electric ranges. When heating by induction the bottom plate additionally assumes the function of a damping element. As is known the heat flow disappears immediately from the bottom of the cooking utensil causing it to cool down instantly with the switching off of the magnetic alternating field if a bottom plate of comparatively thick aluminum or a material of equally good heat-conducting properties is not utilized, which would then necessitate a frequent on-off switching process of the induction range to maintain a constant temperature for the food items inside the cooking utensil. The comparatively thick bottom plate of aluminum or a material of similarly good heat-conducting properties; however, functions as a heat retainer so that a switching on and off of the induction stove to maintain a relatively constant cooking temperature is merely required for longer time intervals. This in particular is important in regard to the registration regulations for induction stoves which determine that within a given time frame a certain number of switching processes must not be exceeded. On the other hand with the invention the advantages of instant heating associated with inductive cooking are essentially sustained despite the comparatively thick bottom plate of aluminum or a material of similarly good heat-conducting properties.

The invention in its preferred embodiment is further explained hereinafter with reference to the drawing.

The sole Figure illustrates schematically the essential constituents of a cooking utensil suitable for induction stoves presenting the innovative aspects of the invention in the form of a pot prior to its assembly.

The cooking utensil has a container liner 1 of the customary austenitic stainless steel (for example No. 1,4301 according to DIN 17007) with a wall thickness of for example between approx. 0.8 and 1.0 mm. The bottom side of the container liner 1 is attached to a bottom plate 22 with a thickness of several millimeters that is composed of aluminum, an aluminum alloy or another material with good heat-conducting properties. On the outside of the bottom plate 2 a bottom disc 3 is attached, which according to the invention either essentially consists of nickel or a nickel alloy or as presented is comprised of an intermediate layer 4 of nickel or a nickel alloy and an outer layer 5 of stainless steel. The bottom disc 3, essentially comprised of nickel or a nickel alloy or the intermediate layer 4 of nickel or a nickel alloy, has a thickness of approximately between 0.2 mm and 2 mm. The thickness of the bottom plate 2 preferably is equivalent to the wall thickness of the container liner 1. The application of the bottom plate 2 on the outside of the bottom of the container liner 1 can take place at an increased temperature through applying an intermediate aluminum foil of for instance a thickness between 0.02 and 0.1 mm by utilizing an impact pressure welding technique as known from DE-OS 22 07 448 wherein preferably pressure impacts are utilized between approx. 1,000 and 1,500 k/cm2 and temperatures between 300° and 500° C. The bottom disc 3 essentially comprised of nickel or a nickel alloy or the intermediate layer 4 of nickel or a nickel alloy can alternatively be plated onto the lower side of the bottom plate 2 or the inside of the outer layer 5 of stainless steel.

Index

1. Container liner
2. Bottom plate
3. Bottom disc
4. Intermediate layer
5. Outer layer

We claim:

1. A cooking utensil of a type used for a pot or a frypan comprising a stainless steel container liner having a comparatively low wall thickness and a comparatively thick bottom plate composed of a metal selected from the group consisting of aluminum and aluminum alloys, said comparatively thick bottom plate in direct contact with the outside bottom of said container liner and a magnetizable nickel alloy bottom disc disposed in direct contact with the outside of said comparatively thick bottom plate said magnetizable nickel alloy consisting of Ni: 70–85%; Cr: up to 6%; Mo: up to 6%; Cu: up to 14%; Mn: up to 6%; Si: up to 1.5%: C: up to 0.7% and the rest Fe, said magnetizable nickel alloy bottom disc joined in direct contact with said bottom plate by a hammer press.

2. The cooking utensil according to claim 1 wherein said bottom disc includes and an outer layer composed of stainless steel.

3. The cooking utensil according to claim 1 wherein said magnetizable nickel alloy bottom disc further comprises an intermediate layer on the side opposite to the side contacting said bottom plate wherein said intermediate layer is selected from the group consisting of nickel and nickel alloys and an outer layer consisting of stainless steel.

4. The cooking utensil according to claim 1 wherein said magnetizable nickel alloy bottom disc has the following composition: Ni: 70 to 80%, preferably approximately 75%, Cr: 1 to 3% preferably approximately 2%; Cu: 3 to 7%, preferably approximately 5%; Mn 0.3 to 0.7%, preferably approximately 0.5%; Si: 0.1 to 0.3%, preferably approximately 0.2%; C: 0.001 to 0.01%, preferably approximately 0.02% and the rest Fe.

5. The cooking utensil according to claim 1 wherein said magnetizable nickel alloy bottom disc has the following composition: Ni 75 to 85%, preferably approximately 80%; Mo: 4 to 6%, preferably approximately 5% Mn: 0.3 to 0.7%, preferably approximately 0.5%; Si: 0.2 to 0.4%, preferably approximately 0.3%; C: 0.001 to 0.01%, preferably approximately 0.02% and the rest Fe.

6. The cooking utensil according to claim 1 wherein said magnetizable nickel alloy bottom disc has a thickness of between approximately 0.2 and 2 mm.

7. The cooking utensil according to claim 1 wherein said magnetizable nickel alloy bottom disc is of a thickness that is approximately equivalent to the wall thickness of said stainless steel container liner.

8. The cooking utensil according to claim 1 wherein said bottom plate attached to the outside bottom of said stainless steel container liner and said magnetizable nickel alloy bottom disc attached to the outside of said bottom plate are alone or together attached by said hammer press at an increased temperature.

9. A cooking utensil of the type used for a pot or a frypan comprising a stainless steel container liner having a comparatively low wall thickness and a comparatively thick bottom plate composed of a metal selected from the group consisting of aluminum and aluminum alloys, said comparatively thick bottom plate disposed on the outside bottom of said container liner and a bottom disc composed of a magnetizable nickel alloy joined in direct contact by a hammer press to the outside of said bottom plate wherein said bottom disc of magnetizable nickel alloy is in direct contact with said bottom plate and has a composite percentage composition by weight of about; 70–85% nickel, up to 6% chromium, up to 6% molybdenum, up to 14% copper, up to 6% manganese, up to 1.5% silicon; up to 0.7% carbon and the remainder iron.

10. The cooking utensil according to claim 9 wherein said bottom disc of magnetizable nickel alloy further includes an outer layer composed of stainless steel.

11. The cooking utensil according to claim 9 wherein said bottom disc of magnetizable nickel alloy has a percentage composition by weight of about 70 to 80% nickel, 1 to 3% chromium, 3 to 7% copper, 0.3 to 0.7% manganese, 0.1 to 0.3% silicon, 0.001 to 0.01% carbon.

12. The cooking utensil according to claim 9 or 10 wherein said magnetizable nickel alloy of said bottom disc has a thickness of about 0.2 to 2 mm.

13. The cooking utensil according to claim 9 or 10 wherein said magnetizable nickel bottom disc is of a thickness that is approximately equivalent to the wall thickness of said stainless steel container liner.

14. A cooking utensil of the type used in pots or frying pans comprising:
(a) a container liner of stainless steel having a comparatively thin wall thickness;
(b) an inside bottom plate composed of a metal selected from the group consisting of aluminum and aluminum alloys disposed on the outside bottom of said container liner having a comparatively greater thickness than said container liner; and
(c) a magnetizable nickel alloy consisting of 70 to 85 percent nickel, up to 6 percent chromium, up to 6 percent molybdenum, up to 14 percent copper, up to 6 percent manganese, up to 1.5 percent silicon up to 0.7 percent carbon and the remainder iron, said magnetizable nickel alloy forming an outside bottom plate having a first side and a second side in which said first side is in direct contact with said inside bottom plate and is joined in direct contact to said inside bottom plate by a hammer press technique.

15. The cooking utensil according to claim 14 wherein a further layer of stainless steel is joined by said hammer press technique to said second side of said outside bottom plate.

16. The cooking utensil according to claim 14 or 15 wherein said outside bottom plate has a thickness of about between 0.2 and 2 mm.

17. The cooking utensil according to claim 14 or 15 wherein said outside bottom plate is of a thickness that is about the thickness of said container liner of stainless steel.

18. The cooking utensil according to claim 14 or 15 wherein said magnetizable nickel alloy of said outside bottom plate is about 80% nickel, 5% molybdenum, 0.5% manganese, 0.3% silicon, 0.02% carbon and the remainder iron.

19. A cooking utensil of the type used in pots or frying pans comprising:
(a) a container liner of stainless steel having a comparatively thin wall thickness;
(b) an inside bottom plate composed of a metal selected from the group consisting of aluminum and aluminum alloys disposed on the outside bottom of said container liner having a comparatively greater thickness than said container liner;
(c) a magnetizable nickel alloy consisting of 70 to 85 percent nickel, up to 6 percent chromium, up to 6 percent molybdenum, up to 14 percent copper, up to 6 percent manganese, up to 1.5 percent silicon up to 0.7 percent carbon and the remainder iron, said magnetizable nickel alloy forming an outside bottom plate having a first side and a second side; and
(d) a foil layer disposed between said first side of said outside bottom plate and said inside bottom plate to assist in joining said outside bottom plate to said inside bottom plate by a hammer press technique.

20. The cooking utensil according to claim 19 wherein a further layer of stainless steel is joined by said hammer press technique to said second side of said outside bottom plate.

21. The cooking utensil according to claim 20 further comprising a foil layer disposed between said layer of stainless steel and said second side of said outside bottom plate to assist in joining said layer of stainless steel to said second side of said outside bottom plate by said hammer press technique.

* * * * *